Jan. 19, 1965    E. C. HERBKERSMAN    3,165,768
DOUBLE COLLAPSE MECHANISM AND COMBINATION THEREOF
WITH PIPE CUTTING AND THREADING MACHINES
Filed Aug. 9, 1963    10 Sheets-Sheet 1

INVENTOR.
EARLE C. HERBKERSMAN
BY
John H. Leonard,
his ATTORNEY.

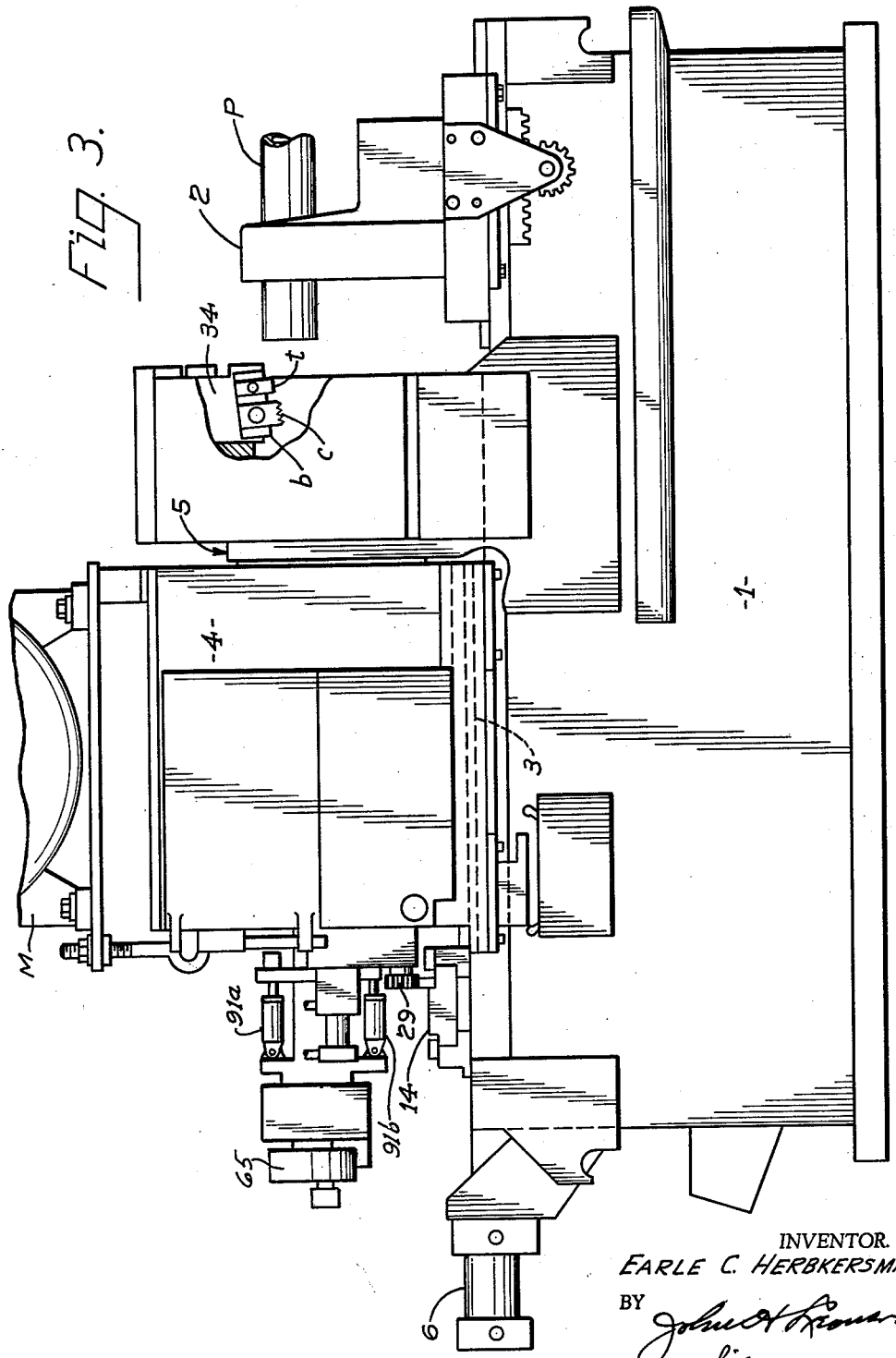

INVENTOR.
EARLE C. HERBKERSMAN
BY
ATTORNEY.

INVENTOR.
EARLE C. HERBKERSMAN
BY
John H Leonard,
his ATTORNEY.

INVENTOR.
EARLE C. HERBKERSMAN
BY
his ATTORNEY.

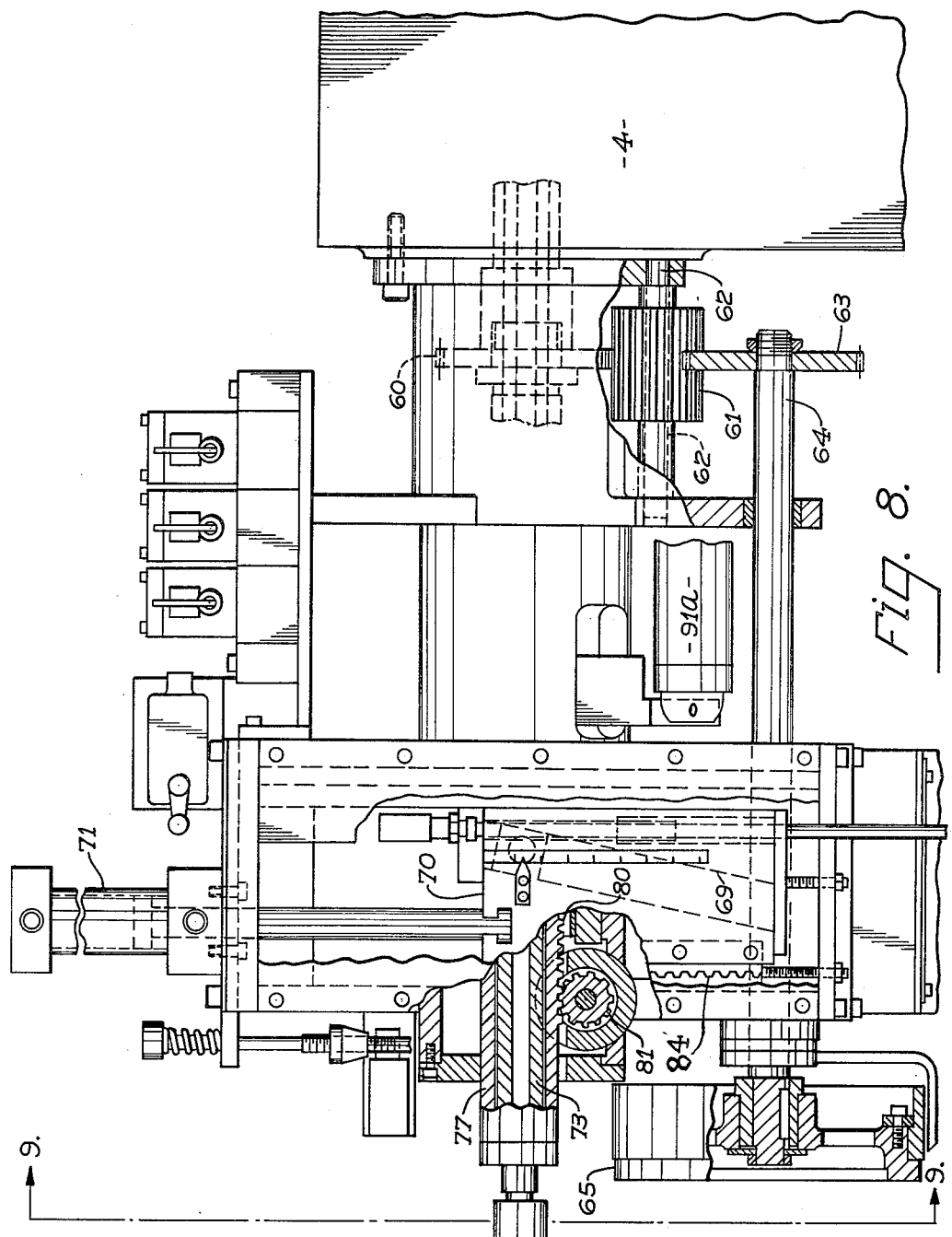

Jan. 19, 1965 E. C. HERBKERSMAN 3,165,768
DOUBLE COLLAPSE MECHANISM AND COMBINATION THEREOF
WITH PIPE CUTTING AND THREADING MACHINES
Filed Aug. 9, 1963 10 Sheets-Sheet 8

INVENTOR.
EARLE C. HERBKERSMAN
BY
*Johns H Linnard,*
his ATTORNEY.

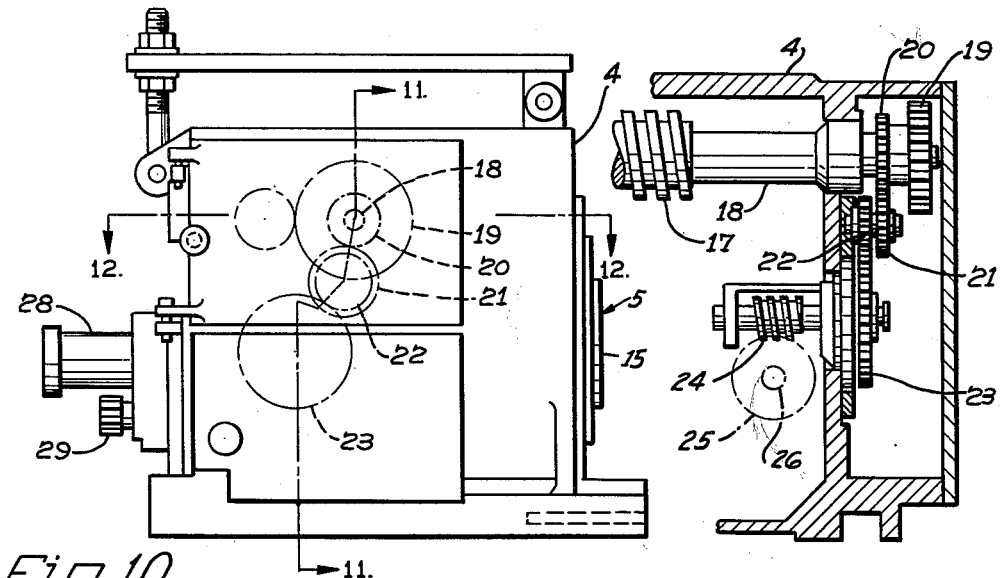
Fig. 10.
Fig. 11.
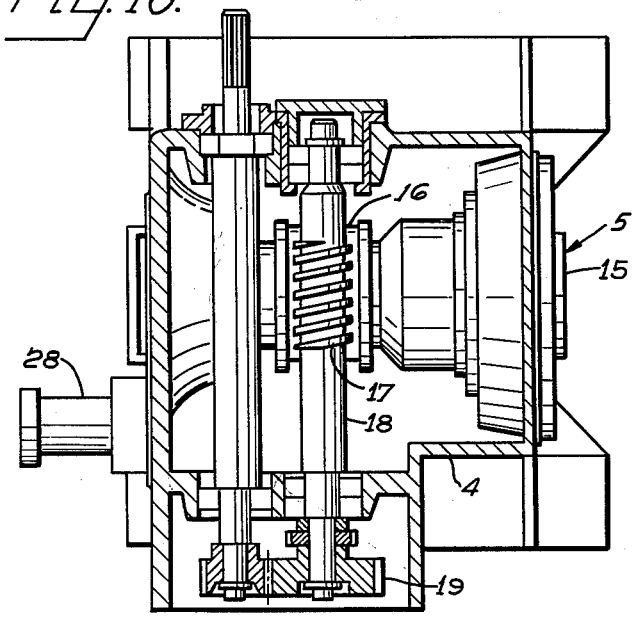
Fig. 12.
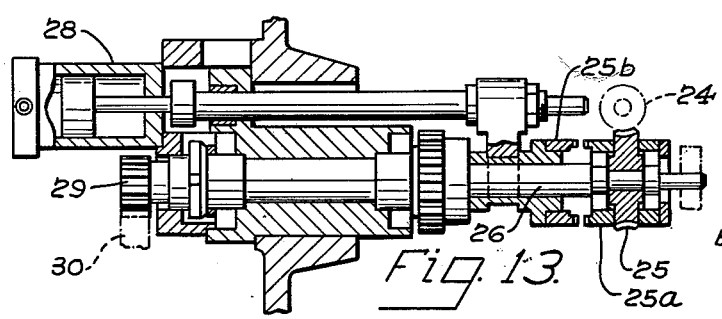
Fig. 13.
INVENTOR.
EARLE C. HERBKERSMAN
BY John H. Leonard,
his ATTORNEY.

3,165,768
DOUBLE COLLAPSE MECHANISM AND COMBI-
NATION THEREOF WITH PIPE CUTTING AND
THREADING MACHINES
Earle C. Herbkersman, Parma, Ohio, assignor to The
Pipe Machinery Company, Wickliffe, Ohio, a corpora-
tion of Ohio
Filed Aug. 9, 1963, Ser. No. 301,018
7 Claims. (Cl. 10—87)

This invention relates to a double collapse mechanism and particularly to a double collapse mechanism for use in connection with pipe and coupling threading machines for cutting tapered seating areas and tapered threads on the ends of pipes and in the couplings.

In present day practice, particularly in connection with pipe and couplings used in deep oil wells, special threads are provided on the pipe and in the coupling, these having a high resistance to axial separation of the coupling and pipe. However, such threads are not necessarily adequate to provide a seal tight enough to prevent leakage under high fluid pressures present in such deep wells. Consequently, between the threaded portion of the pipe and the end thereof, a sealing surface, coaxial with the thread, is provided.

Usually this sealing surface is a frusto-conical surface having its smaller base at the end of the pipe. Such a sealing surface is accurately turned on the pipe and a complementary surface is provided in the coupling so that, when the pipe is screwed into the coupling, the threads draw the sealing surfaces firmly together to provide what is commonly referred to as a "seal lock" and on which dependence is placed for maintaining a seal under the high pressures involved.

The present mechanism is shown for purposes of illustration as applied to cutting such a sealing surface and coaxial tapered threads on the exterior of the end portion of a pipe, its application to cutting complementary threads and sealing surfaces in pipe couplings being apparent from the illustrative example. The double collapse mechanism is shown incorporated in a machine such as described in United States Letters Patent No. 2,996,736 of William L. Benninghoff, issued August 22, 1961, its use for other purposes and in other machines being readily apparent from the illustrative example herein.

One of the objects of the present invention is to provide a simple mechanism which can be incorporated in rotary spindle machines of this general character which employ tool heads in which radially movable carriers for chasers and cutting tools are mounted so that they can be retracted radially from the axis as the threading and cutting proceeds from one end of a coupling toward its midportion. These carriers must be "collapsed," that is, withdrawn generally radially from their operative positions, at the end of the cutting operation of each tool or tools which they carry.

A specific object is to provide a collapse mechanism to manipulate the carriers of the cutting tool for the sealing surface and the threading chaser in such relation that, as the pipe and head are advanced axially relatively toward each other, the first cutting tool cuts the tapered sealing surface; second, at the end of this cut, the tool is collapsed and, concurrently, the chaser or chasers are retracted outwardly from the axis of the pipe sufficiently to avoid contact with the sealing surface and to be in position for starting the thread at the inner end of the sealing area, and, third, as the advance continues, the chasers are gradually retracted outwardly from the axis as threading continues until the tapered thread is fully formed; and fourth, both the tool and chaser are suddenly collapsed again at the end of the threading operation so that both are fully clear of the pipe, whereupon the head can be returned rapidly to starting position without danger of marring either the threads or the sealing area.

Another object is to provide a mechanism of this character in which a wide variety of variations can be obtained in the amount of collapse of the cutting tool for the sealing area relative to the amount of collapse of the chaser, and the amount of further collapse of both after the threading operation.

Another object is to provide a mechanism of this character which may be readily adjusted for differences in pipe diameter, and differences in the relative lengths of sealing area and thread, selectively operative to provide a large number of predetermined relations between the amount and time of collapse of the tool and of the chaser after each has finished its particular operation.

Various other objects will become apparent from the following description wherein reference is made to the drawing, in which:

FIG. 3 is a side elevation of the machine, such as illustrated in the above entitled patent, with the present collapse mechanism incorporated therein;

FIG. 7 is a vertical cross sectional view taken on the line 7—7 of FIG 6a;

FIG. 8 is a fragmentary top plan view, partly in section, of the structure illustrated in FIG. 6a, as viewed from the line 8—8 in FIG. 6a;

FIG. 10 is a side elevation of the spindle carriage, indicating the driving gears for driving the head;

FIG. 11 is a fragmentary vertical sectional view taken on the line 11—11 of FIG. 10;

FIG. 12 is a vertical horizontal sectional view taken on the line 12—12 of FIG. 10;

FIG. 13 is an enlarged fragmentary sectional view showing a clutch mechanism in the drive of the spindle carriage, and is taken on the line 13—13 of FIG. 4;

Figure 1:
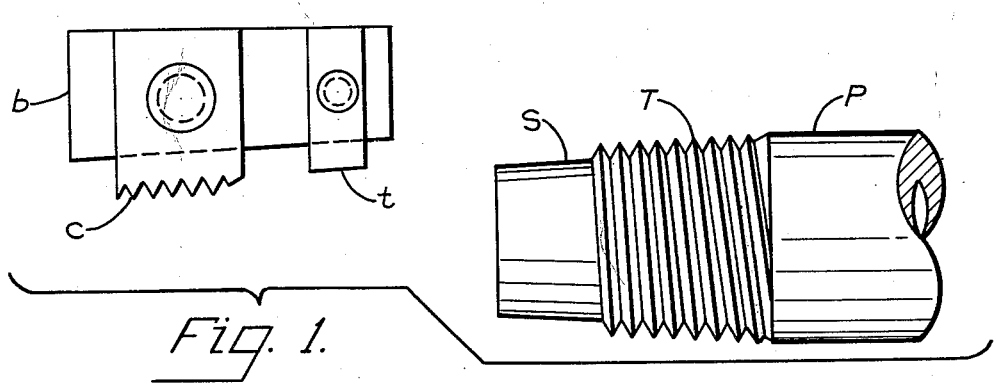
FIG. 1 is a diagrammatic illustration of a pipe of the prior art and with a cutter and chaser showing certain relations to be maintained by the present mechanism during cutting and threading.

Referring first to FIG. 1, there is shown a pipe P of the type for use in deep wells. This pipe has frusto-conical sealing surface S and a threaded portion T, the sealing surface being tapered from the end of the pipe toward the threaded portion and the threaded portion being tapered from the inner end of the sealing surface to the inner end of the thread.

For cutting a sealing surface and thread of this character, it is desirable to employ a cutting tool *t* and a threading chaser *c*, as illustrated in FIG. 1, carried on a carrier *b* which, in the case of a pipe, can be collapsed from an inner position, in which the tool *t* is cutting the tapered sealing surface S, outwardly of the pipe axis to an outer position in which the tool *t* is clear of the pipe and the chaser *c* is in position for cutting the threaded portion T and, at the end of the threading operation, can be collapsed further radially outwardly from the axis of the pipe so as to clear both the tool *t* and the chaser *c* from the pipe, for permitting return of the spindle head to starting position. Obviously, if a coupling is to be made instead of a pipe, the collapse of the tool *t* and chaser *c* is radially inwardly.

Figure 2:
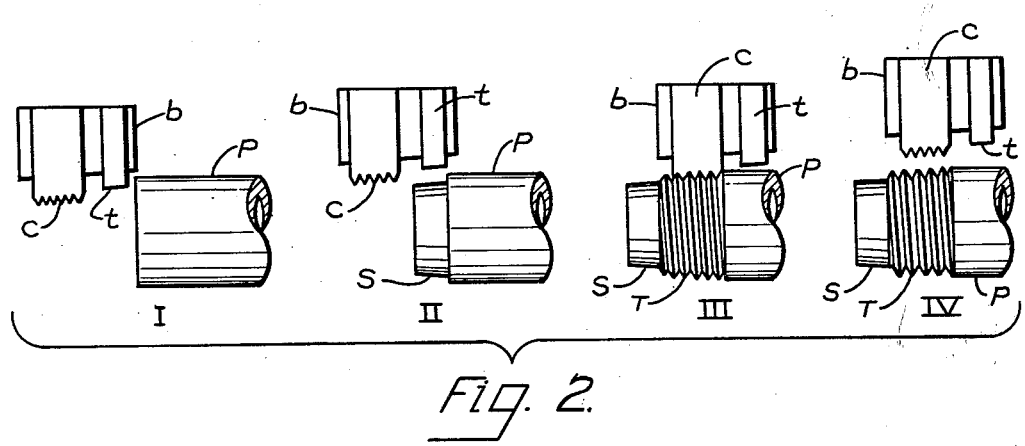
FIG. 2 is a diagrammatic illustration, similar to FIG. 1, showing successive stages in the application of the cutter and chaser to the pipe for forming the sealing area and thread illustrated in FIG. 1.

The arrangement of the parts for such an operation is illustrated in FIG. 2, assuming both the tool *t* and chaser *c* are carried on the same carrier *b*. If desired, a plurality of carriers, each carrying a tool and chaser, or some carrying tools and some chasers, may be employed. As the carrier approaches the end of the pipe it is in position I, in which the tool *t* is ready to engage the pipe for cutting. In this position, the surface S is cut, both the tool *t* and the chaser being gradually retracted outwardly from the axis of the pipe during the cutting operation. This continues until the tool *t* completes the surface S of the pipe, whereupon the collapse mechanism of the present invention becomes operative for the first time and collapses the carrier *b* outwardly to move the cutter *t* clear of the surface S of the pipe and to move the chaser to the proper radial position, indicated at II, for beginning its cut when it reaches the portion T. When the chaser reaches, the portion T, it becomes operative so that, upon continued operation of the spindle, the thread portion T is cut on a taper until the chaser has completed the operation and the thread is run out to the surface of the pipe, as indicated by position III.

In this position, the mechanism is operated to cause the second collapse whereby the tool *t* and chaser *c* are retracted outwardly radially from the axis so that both are clear of the pipe, as indicated at IV. In this last position, the spindle head and the pipe are moved axially away from each other to a starting position, ready for starting a like operation on another pipe.

In the present illustration, it is assumed that both the cutter *t* and the chaser *c* are carried on the same carrier *b*. However, as mentioned, a greater number of carriages, each with a tool *t* and chaser *c* may be provided, or part of the carriages may carry tools *t* of a progressive set and part chasers *c* of a progressive set, this being readily obtainable since all of the carriers are collapsed concurrently the same amount.

Referring to the drawings, the machine is essentially that of the above identified patent except for the incorporation of the double collapse mechanism therein, and this mechanism is such that it can be incorporated without materially altering the machine itself.

The machine comprises a frame or bed 1 on which is mounted a work holding chuck 2 which is adapted to grip the length of pipe P to be threaded and to hold the pipe in fixed axial position relative to the chuck with one end projecting toward the spindle of the machine for the purposes of being externally threaded. Mounted on suitable slideways 3 on the bed is a spindle carriage 4 in which is rotatably mounted a spindle assembly 5. With this arrangement, the spindle can be moved toward and away from the chuck axially of the pipe. The carriage 4 is arranged for rapid traverse axially from the starting position to a position in which the threading operation is to be initiated, and for rapid return.

For this purpose, there is secured to the frame 1 of the machine, a suitable hydraulic piston and cylinder assemblage 6, comprising a cylinder 7 and piston 8 having a rod 9 connected to a slide 10. The slide 10 is reciprocable forwardly and rearwardly along suitable guideways on the bed 1 and carries a pin 11 with a follower 12 thereon, the follower 12 being slidably accommodated in a suitable slideway or groove 13 in a sine bar 14, which is slidable transversely of the path of the slide 10. Prior to the initiation of the threading operation by the feed of the spindle carriage axially of the spindle, the sine bar 14 is held stationary relative to the carriage 4. Consequently, upon the introduction of fluid, into the head end of the assemblage 6, the slide 10 is moved in a direction in which the carriage is to be advanced and, so long as the sine bar 14 is held in fixed position relative to the carriage 4, the connection between the piston rod and the carriage 4 is direct and the carriage 4 and rod 9 move as a unit axially of the spindle and pipe. With the slide 10 held rigidly in its forwardmost position, the feeding of a spindle carriage for cutting and threading is begun.

The slideway or groove 13 of the sine bar 14 is bias to the direction of sliding of the sine bar so that as the sine bar 14 is slid transversely of the direction of travel of the spindle, it advances or retracts the spindle carriage, depending upon the direction of movement of the sine bar. This is done in timed relation to rotation of the spindle. For providing this timed relation, the spindle, indicated at 15, is provided with a main driving gear 16, driven by a suitable power driven worm gear 17 through a transmission train including a shaft 18 rotatable with the gear 17 and driven by a suitable gear 19 which, in turn, is driven through a jack-shaft and belt and pulley, by a suitable motor M on the carriage.

As beat illustrated in FIGS. 10 through 12, reduction gears 20, 21, 22 and 23 are driven by the shaft 18, and in turn drive a worm gear 24 which drives a cooperating gear 25 rotatable with a clutch element 25*a*. The clutch element 25*a* is cooperable with a clutch element 25*b* and shaft 26, and is operated by a piston cylinder assemblage 28 to couple the gear 25 drivingly to the shaft 26 and disconnect it when desired. The shaft 26, in turn, drives a pinion 29 which engages a rack 30 on the sine bar 14. Thus the sine bar 14 is moved at a predetermined rate relative to the rotary speed of the spindle. This advances the spindle by the sine bar is fixed uniform relation to the spindle rotation, thereby assuring proper pitch of the thread.

Figure 4:
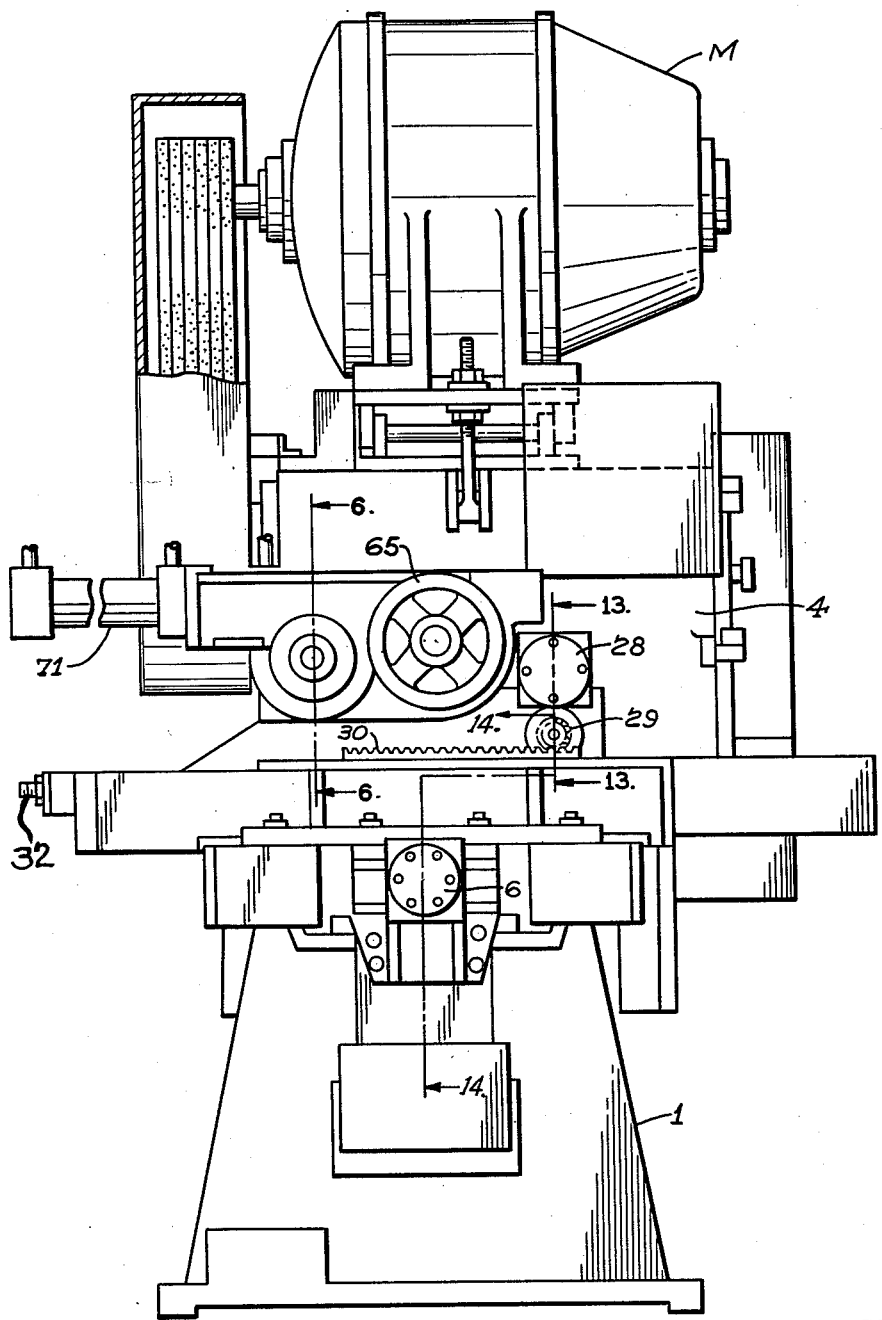
FIG. 4 is a left end elevation of the machine illustrated in FIG. 1.
Figure 14:
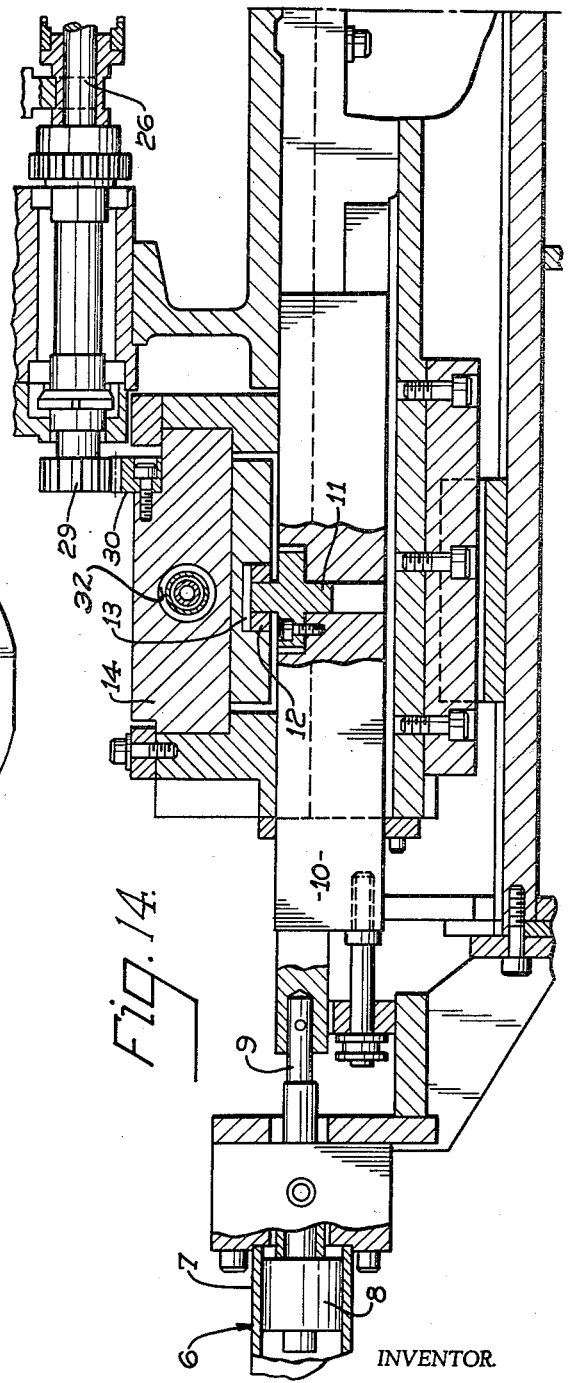
FIG. 14 is an enlarged fragmentary sectional view showing the rapid traverse drive for the spindle carriage, and is taken on line 14—14 of FIG. 4.

As illustrated in FIGS. 4 and 14, the sine bar is yieldably urged in a direction opposite from that in which it is driven by the rack and pinion by means of a piston and cylinder assemblage 71 on the carriage 4. This assemblage may also be operated for rapid retraction of the sine bar 14 at the end of the threading operation.

The spindle carries a rotary cutter head 33 on which are mounted a plurality of carriers or tool blocks 34. As mentioned, each block may carry a cutting tool for cutting the sealing surface on the pipe and a chaser for cutting thread, or, if desired, a larger number of blocks than the two illustrated may be used, some carrying cutting tools of a progressive set and some chasers of a progressive set.

Figure 5:
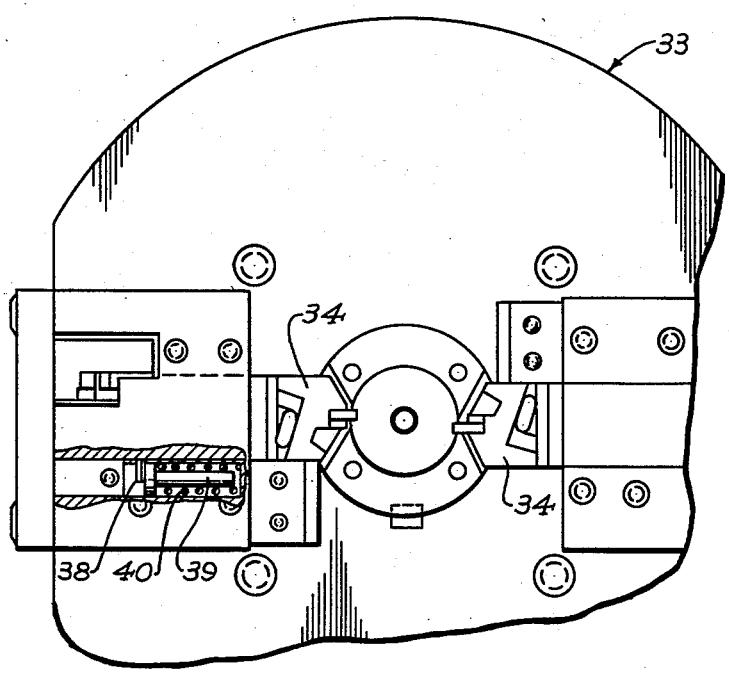
FIG. 5 is a fragmentary right end elevation of the machine showing the tool head and tool carriers therein.
Figure 7:
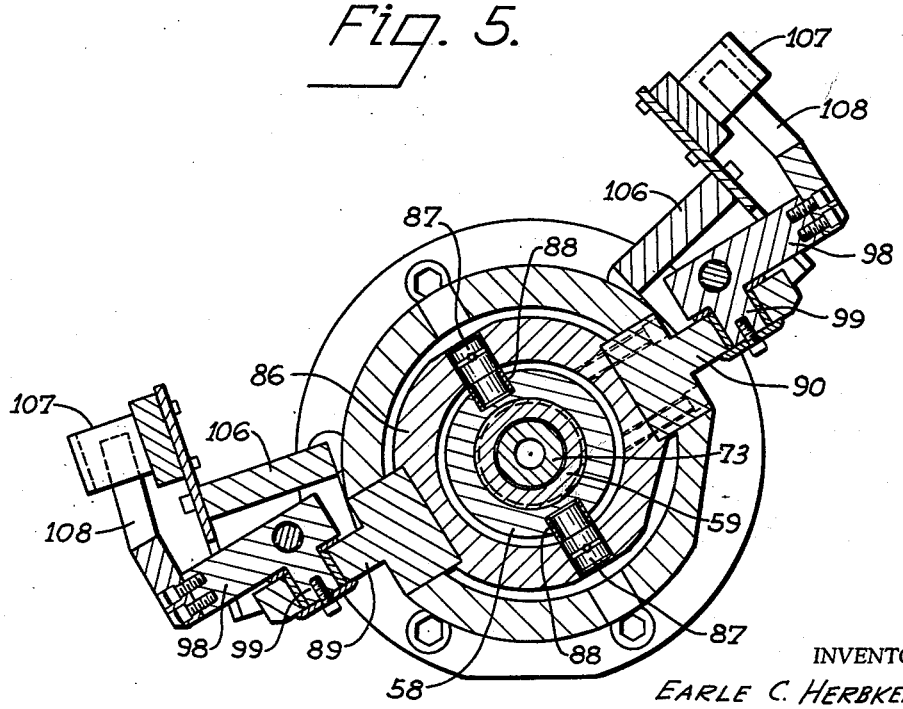
Figure 6A:
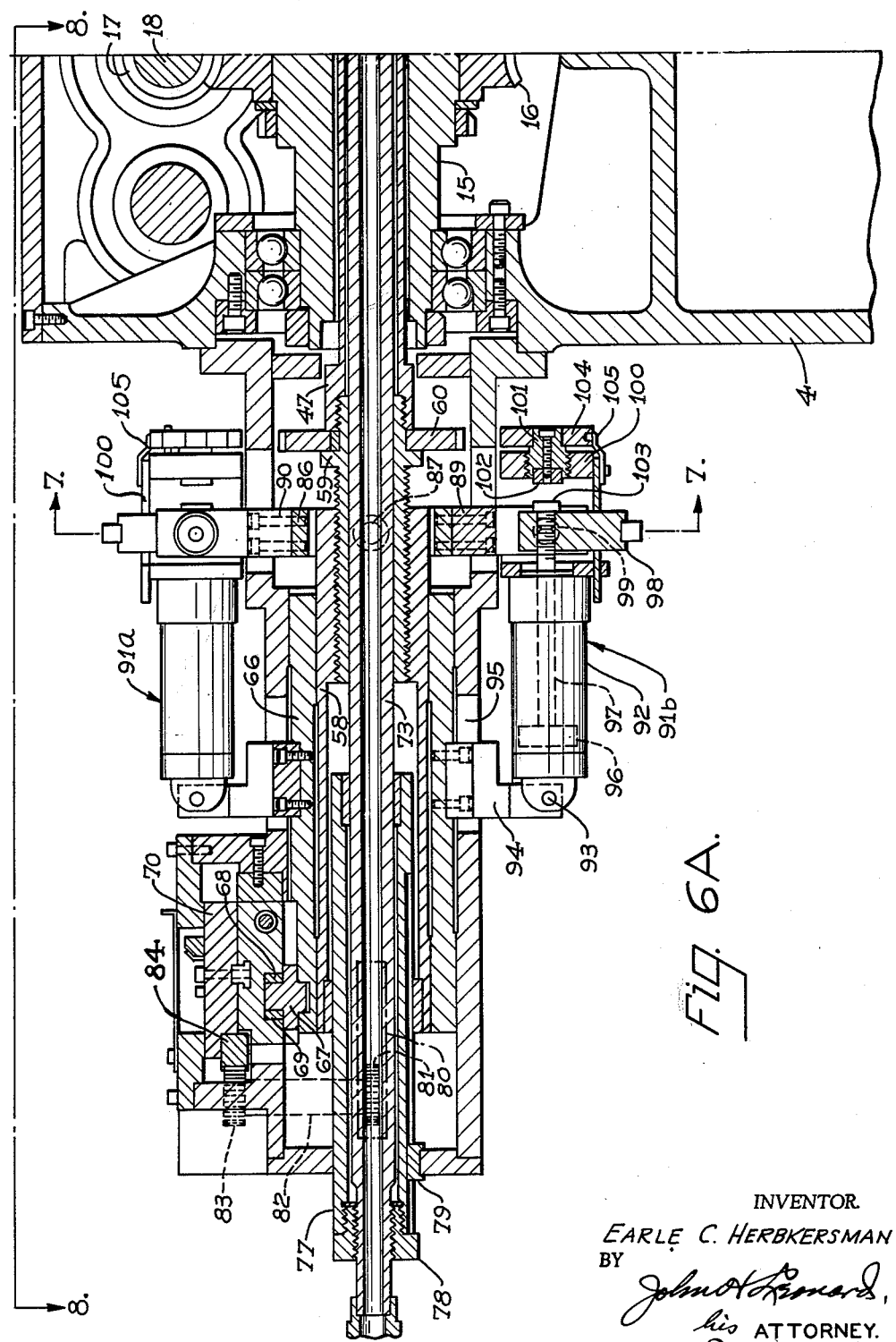
FIGS. 6a and 6b are the left and right portions, respectively, of a vertical longitudinal sectional view through the spindle axis of the machine, and are taken on line 6—6 of FIG. 4.
Figure 6B:
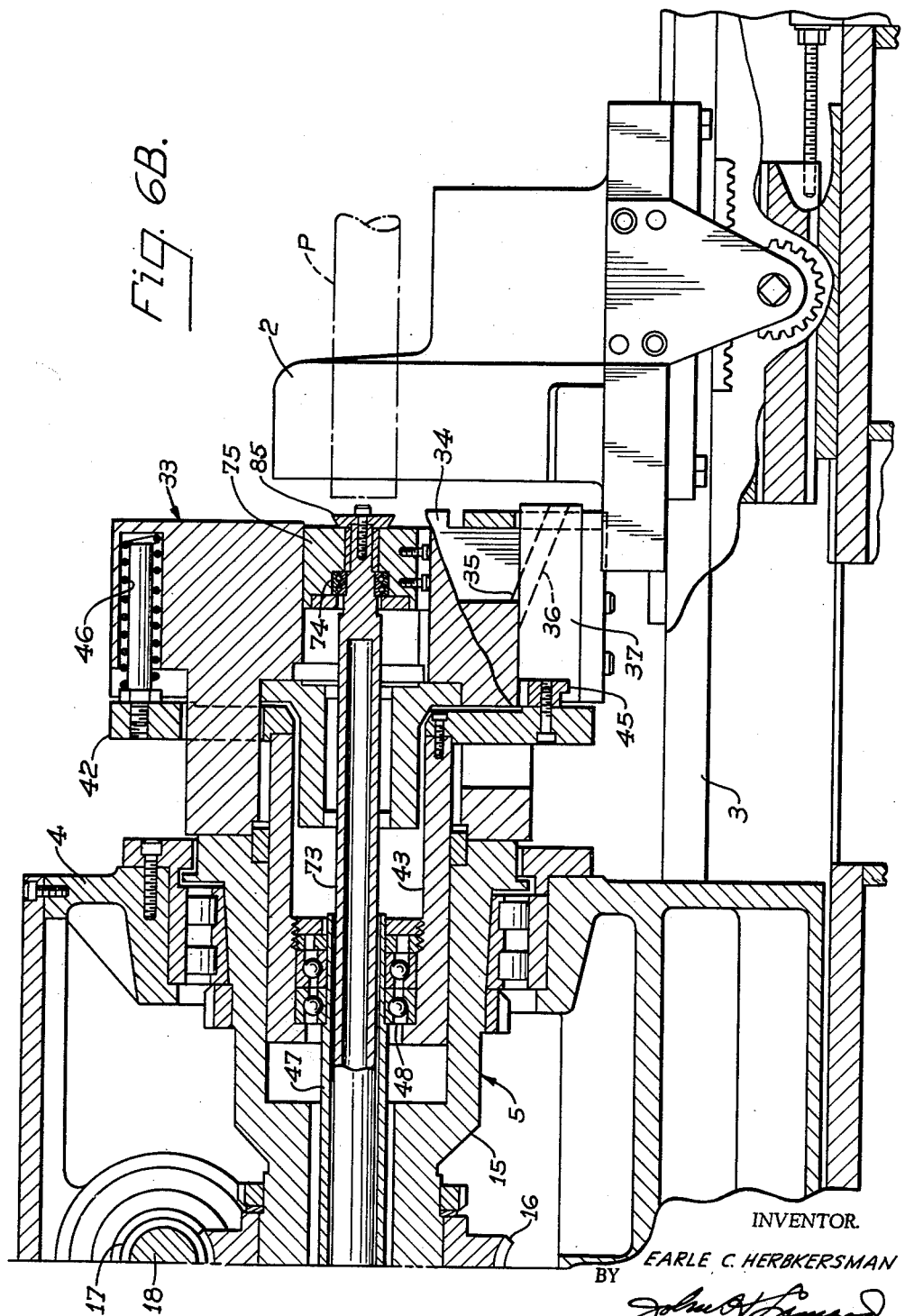
Figure 9:
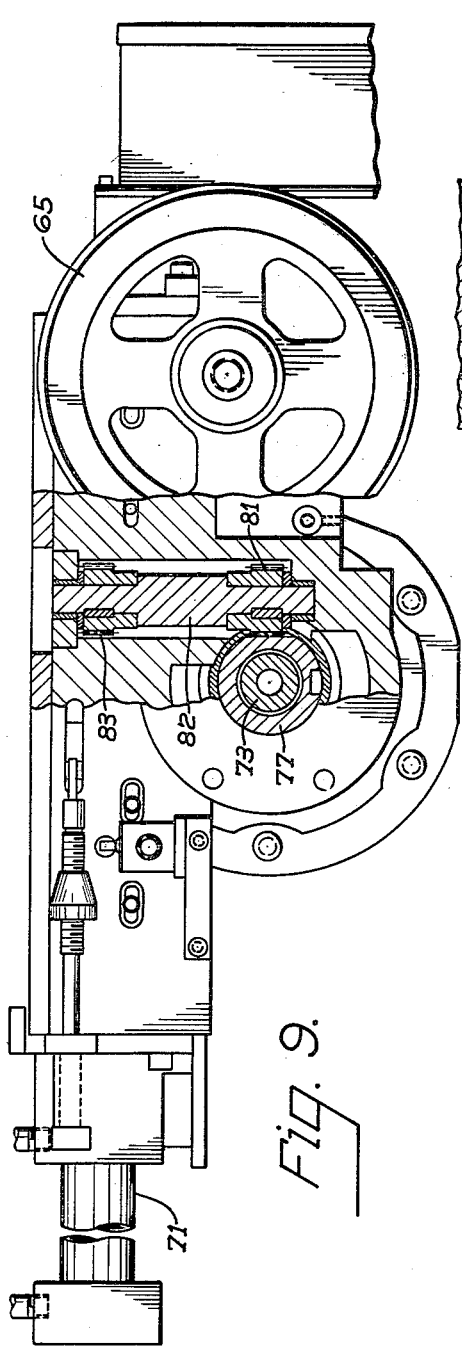
FIG. 9 is an enlarged fragmentary rear end elevation, partly in section, of the structure illustrated in FIG. 8, and is taken on the line 9—9 thereof.

In the form illustrated, each block 34 is shown as carrying both a cutting tool *t* for cutting the sealing surface S, and a chaser *c*, for cutting the thread T. The tool and chaser are spaced apart from each other on the block on which they are carried endwise of the axis of rotation. For cutting external threads, the blocks 34 are moved to an inner starting position and retracted radially outwardly as the head 33 advances axially of the pipe P. For effecting this movement of the blocks 34, each block is provided with a spline 35, as illustrated in FIG. 6*b*, which engages a suitable bias slot 36 in an associated cam block 37. Each block 37 is slidable parallel to the axis of the spindle in opposite directions, selectively, and in so moving causes its associated block 34 to recede and advance, respectively. As illustrated in FIG. 5, each carrier block 34 is provided with a pin 38 which is engageable by a suitable plunger 39 in the head and driven by a spring 40 so that, as each cam block 37 is moved rearwardly relative to the cutting end of the head 33, the associated block 34 recedes from the axis of rotation.

In order to advance and retract the cam blocks 37, a suitable annular plate 42 is provided. The plate 42 is supported in coaxial relation to the spindle by a collar 43 and is rigidly connected to all of the cam blocks 37 by clamps 45. The plate 42 is normally urged in a direction away from the cutting end of the spindle head by suitable springs 46. The collar 43 is connected, in coaxial relation, with the tubular push rod 47, by means of antifriction bearings 48, so that the rod 47 and plate 42 are movable together axially and rotatable freely relative to each other about the axis of rotation. The rod 47 is connected to a die adjustment tube 58 by means of an adjustment tube extension 59. The extension 59 is rotatably connected in coaxial relation to the rod 47 and is threadably connected in coaxial relation to the tube 58. The extension 59 carries a gear 60 which is driven by an elongated companion gear 61 supported on a shaft 62. The gear 61, in turn, is driven by a spur gear 63 carried on and rotatable with a shaft 64 which, in turn, is connected to the adjusting wheel 65 at the end of the machine opposite from the spindle head. This arrangement permits the adjustment of the radial position of the chasers in starting position.

The rod 47 is connected in coaxial relation to, and for movement with, the tube 58. The tube 58 is slidable in, and relative to, a coaxial recede tube 66. The tube 66 carries the slide pin 67 which is received in a slide block 68, which, in turn, is slidable in a bias slot 69 of a sine bar 70. The slot 69 extends on a bias generally transversely of the direction of axial movement of the spindle head so that the tube 66 can be advanced by the sine bar 70. Advance of the tube 58, advances extension 59 and push rod 47, and thereby advances the plate 42 accordingly. Retraction of the tube 58 controls return of the plate 42 when the tube is drivingly connected thereto. The sine bar 70 is connected to a piston and cylinder assemblage 71 which yieldably resists movement of the sine bar in a direction to retract the blocks 34. To advance and retract the blocks 34, in relation to the rotation of the head 33, the sine bar 70 must be driven in relation to the advance of the head, and hence in relation to the advance of the pipe, and the sine bar must be drivingly connected to the tube 58 for driving the sleeve.

For this purpose, a tubular push rod 73 is mounted in coaxial relation to the spindle. The forward end of the rod is supported in a suitable bearing 74 which is mounted in a sliding sleeve 75 slidable in, and axially of, the head 33. The rod 73 extends coaxially through, and in spaced relation to the hollow rod 47, extension 59 and tube 58. Near its opposite end, the rod 73 carries a rack sleeve 77 which may be adjusted axially of the rod 73 by a nut 78. The sleeve 77, in turn, is slidably mounted in the spindle housing and is constrained from rotation about its axis by a key 79. The sleeve 77 carries a rack 80, indicated by the dot and dash lines in FIG. 6a. The rack 80, in turn, engages a pinion 81 mounted on and rotatable with an upright shaft 82. The shaft, at its upper end, carries a pinion 83 which is in driving relation with a rack 84 on the sine bar 70. The push rod 73 carries at its forward end a pad 85 against which the end of the pipe P engages when the spindle head is advanced toward the pipe. As the advance continues, the rod 73 is pushed axially in a direction away from the tool end of the head 33, as determined by the position of the pipe and relative to the head 33. As the pipe pushes the rod 73 to the left in FIG. 6b, for example, it operates the sine bar 70, against the resistance of the assemblage 71, in a direction so as to retract the blocks 34 and retract them from the axis of the head, assuming the tube 58 is connected to the tube 66 for movement axially therewith. Upon release of the push rod 73 from the pipe P, the assemblage 71 returns the sine bar 70 and rod 73 to starting position.

The structure thus far described, except as to the use of cutters and chasers on the same block, as heretofore described, is essentially the machine structure of the above identified patent.

However, as mentioned, beginning at the starting position of the spindle head 33, it is desired first to apply the cutting tool t, and gradually retract the carrier blocks 34 as the head advances, to cut the sealing area S by the tool t on a taper—then effect a first collapse of the blocks 34 to remove the cutting tool t from the pipe and bring the chaser c to the proper radial position for beginning its cutting of a tapered thread, and, after the thread is cut, to effect a second collapse to remove both the tool and chaser from the pipe and to permit their return to starting position without interference with the thread T and the sealing surface S on the pipe P.

For this purpose, the retracting structure thus far described is provided with means for rendering it also a double collapse mechanism which can change the position of the tool t and chaser c into positions different from those in which they would normally be moved through the operation of the push rod 73.

To provide for the double collapse, a yoke 86 is mounted on the tube 58 for rocking about an axis normal to the axis of the tube 58 and spindle. The yoke 86 is disposed normally in a plane normal to the axis of the tube 58 and spindle head. It is connected to the tube 58 by means of coaxial diametrically opposite trunnions 87 on the yoke which are received in bearing sockets 88 in the tube 58. The yoke 86 is provided with arms 89 and 90 which extend radially to the outside of the adjacent portion of the spindle housing. The yoke 86 is connected to the recede tube 66 by means of piston and cylinder assemblages, thus interconnecting the recede tube 66, controlled by the sine bar 70, to the plate 42.

In the form illustrated, two such assemblages, 91a and 91b, are employed and are connected to the arms 89 and 90 of the yoke 86, respectively. The assemblages are disposed at diametrically opposite sides of the spindle axis with their axes generally parallel to the axis of the spindle. Since the assemblages are essentially the same, only the assemblage 91b will be described in detail.

The assemblage 91b comprises a cylinder 92 connected at its head end by a pivot 93 to a bracket 94 which is fixedly connected to the recede tube 66. Suitable slots 95 are provided in the spindle housing to permit the brackets to move axially with the tube 66 the required amount. Mounted within each cylinder 92 is a piston 96 having a piston rod 97. The piston rod 97 is connected to a union block 98. The block 98 has a trunnion 99 by which is it rockably connected to the arm 89 so as to rock relative thereto to compensate for the disposition of the yoke on a bias to a plane normal to the axis of the piston rod.

Assume both assemblages 91a and 91b are in fully extended condition and hydraulically locked within the blocks 34 in inward starting position. The recede tube 66 and the die adjustment tube 58 are connected in fixed axial position relative to each other. Therefore, as the rod 73 is moved by the pipe, the plate 42 is moved axially under the control of the sine bar 70 to retract the blocks from the spindle axis. This uniform retraction provides the proper taper of the surface S. On the other hand, if one of the assemblages remains hydraulically locked, and the other assemblage is operated to retracted position, the yoke is swung about the trunnion 99 of the locked assemblage and moves the tube 58, and thereby the rod 47 and plate 42 away from the cutting end of the spindle. Since the trunnion 87 is midway between the trunnions 99, this movement is one-half of the total stroke of the retracted one of the assemblages. This movement retracts or collapses the blocks 34 suddenly away from the axis. This collapse is effected for withdrawing the tool t from the finished seating surface S and disposing the chaser in proper radial position in which to start its cut when it advances to cutting position. The retracted assemblage is kept hydraulically locked in retracted position, the other assemblage remaining in extended position as the thread is cut. When the thread is completed, then the yoke 86 is swung about the trunnions 99 of the already retracted assemblage. This moves the rod 47 and plate 42 away from the cutting end of the head suddenly a distance again one-half of the total stroke of the second assemblage to be retracted.

The reverse is true when the assemblages start fully retracted, as when cutting such surfaces and threads in a coupling, and retraction and collapse are toward, not away from, the axis.

In the form illustrated, as mentioned, retractions of the plate 42 cause outward retraction of the blocks 34. Since additional retraction by sudden collapse is necessary, the operation of cutting and threading is started with the assemblages in extended position.

The rod 73 controls the position of the pipe axially relative to the tool and chaser through the sine bar 70, recede tube 66 and assemblages 91a and 91b, yoke 86, rod 47 and plate 42. The rate of advance of the head is controlled by the sine bar 14 driven in fixed geared relation to rotation of the spindle.

However, to assure the starting position in the properly extended positions of the assemblages 91a and 91b, suitable brackets 100 are carried on the cylinders and extend to a position disposed forwardly of the blocks 98 and yoke 86. Mounted in each bracket 100 is a threaded adjustment member 101 having at the end facing the yoke a hard steel button 102. A hard steel stop button 103 is provided on the block 98 in position to engage the button 102. An adjustment wheel 104, calibrated so as to be cooperable for indication with an indicator 105, is provided for each assemblage, so that the predetermined exact extended positions of the pistons can be fixed by adjustment of the button 102. This permits variation in operation, as the start may be made with the assemblages extended different amounts, so that one collapse may be a different amount from the other.

Mounted on the brackets 106, respectively, are limit switches 107, which can be engaged for tripping by a suitable finger 108 on the associated block 98.

Figure 15:
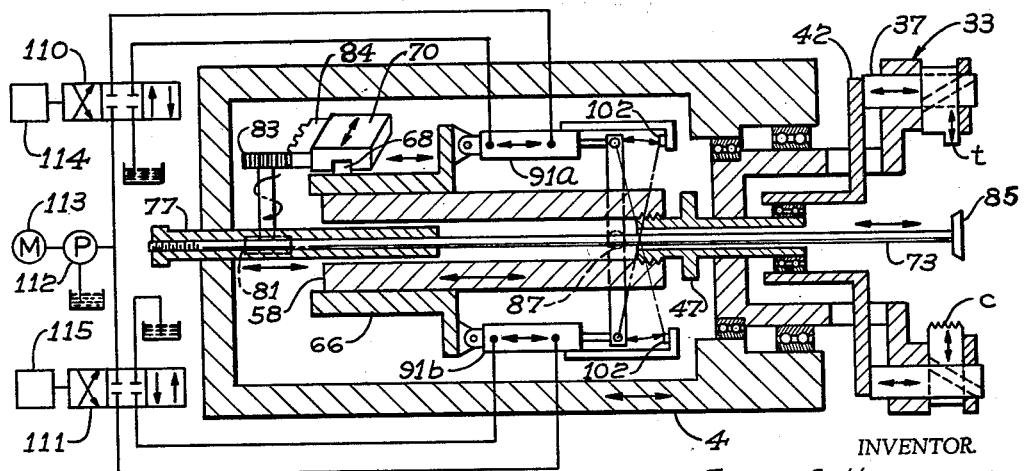
FIG. 15 is a diagrammatic illustration of the double collapse mechanism and hydraulic circuit therefor.

Referring to FIG. 15, the assemblages 91a and 91b are connected through valves 110 and 111, respectively, with a pump 112 driven by a motor 113. The valves 110 and 111 may be operated by solenoids 114 and 115, respectively, and can be remotely controlled independently of each other. These can be controlled, if desired by the operator, but preferably, as in most present day equipment, they are controlled by limit switches to effect the above described operations in the sequences selected. Such controls form no part of the present invention.

*General operation*

Therefore, asuming a pipe P is gripped in the chuck with its end protruding toward the spindle head, the carriage for the spindle is advanced by the piston and cylinder assemblage 6 to predetermined starting position, whereupon the sine bar 14 is operated in timed relation to the speed of rotation of the spindle to advance the spindle toward the pipe at the required rate depending upon the thread pitch desired. The pipe strikes the pad 85 at which time the tool $t$ is substantially at the proper position to begin a cut. Advance of the spindle carriage toward the pipe causes engagement of the pad 85 of the tube 73 with the pipe. The tube 73, operating the sine bar 70 through the rack 80, pinions 81 and 83, and rack 84 on the sine bar 70 controls the recede of the blocks 34, so long as the assemblages 91a and 91b are hydraulically locked in extended position so that they and the rod 47 and plate 42 operate as a rigid unit. Hence the tool $t$ is retracted gradually for cutting the tapered sealing surface S. When the surface S is completed, one of the assemblages, for example 91a, is operated from extended to retracted position, thus causing a collapse—a sudden additional retraction of the tool $t$, and the chasers $c$ superimposed on their normal retraction by the sine bar 70. This retraction is sufficient to dispose the tool $t$ outwardly beyond the larger end of the surface S and the portion T to be threaded, and to dispose the threader in a radial position such that, when it advances to the portion T, it will engage it in the proper radial position for starting the thread. Meanwhile, the spindle head continues to advance due to the driving of the sine bar 14. The normal retraction due to the sine bar 70 continues. When the chaser $c$ reaches the portion T of the pipe to be threaded, the normal retraction continues until the thread is run out. Thereupon the other assemblage 91b is retracted suddenly, providing a second collapse removing the tool $t$ and chaser $c$ completely from the pipe. In this condition the sine bar 14 can be released by disengaging the clutch elements 25a and 25b, whereupon the assemblage 6 retracts the carriage to starting position.

Figures 16, 17:
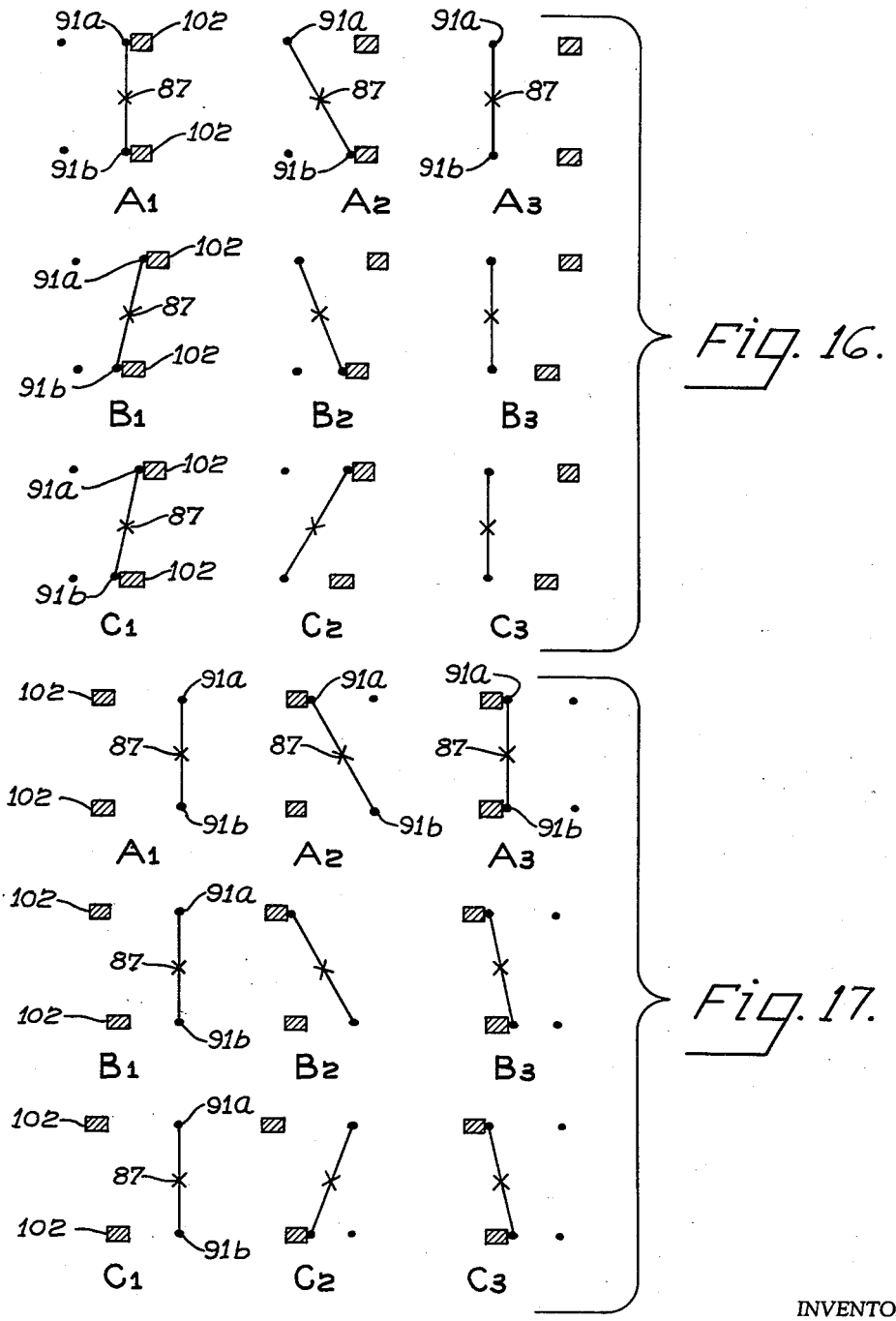
FIG. 16 is a diagrammatic illustration showing the preferred settings of the collapse mechanism.
FIG. 17 is a diagrammatic illustration, similar to FIG. 16, showing an additional setting of the double collapse mechanism.

Referring next to FIG. 16, this operation is diagrammatically illustrated. At the left, position $A_1$, both pistons are in extended position as determined by their stops 102. For the first collapse, assemblage 91a is fully retracted, as in position $A_2$. Assuming it has a stroke of three quarters of an inch, the trunnion axis 87 for the rod 47 is retracted to the left three eighths of an inch. With the assemblage 91a fully retracted, if assemblage 91b is retracted, the axis of the trunnion moves another three eighths of an inch to position $A_3$. As further variations, for example, by adjustment of the stops 102, the stop for assemblage 91a may be set farther toward the right than the stop of 91b, so that 91a has a three quarter inch retraction stroke and 91b a maximum retraction stroke of one-half inch. Starting in position $B_1$, for the first collapse, the axis of the trunnion and hence the rod 47 moves three eighths of an inch to position $B_2$. Upon the second collapse, it moves only one quarter of an inch, to position $B_3$, making a total of five eighths inch of collapse. Starting with the same position, as in $C_1$ and retracting first assemblage 91b to position $C_2$ a quarter inch collapse is effected. The second collapse, to reach position $C_3$, is then three quarters of an inch.

Numerous other variations and combinations of retracting strokes of the assemblages 91a and 91b can be obtained, and are selected according to the results desired.

In the form illustrated, the stops 102 are arranged to stop the assemblages 91a and 91b in their fully extended positions. However, if desired, as shown in FIG. 17, these stops may be placed in a position for stopping when the assemblages are in fully retracted position, as illustrated in sketch $A_3$ in FIG. 17. Relations similar to those in positions A, B and C of FIG. 16 can be provided, as shown in positions A, B and C of FIG. 17, with the additional feature that in FIG. 17, an adjustment for change in the sealing surface is independent of the cylinder stop change.

It is preferred, however, that the stops be on the side illustrated in FIG. 16, that is, to engage the buttons 103 in the extended position of the assemblages, even though this does require adjustment of both of the stops to avoid any change in sealing surface for a change in the thread.

Having thus described my invention, I claim:

1. In a threading machine, a power driven rotary spindle, a tool head carried thereby, a tool carriage mounted on the head for movement, during rotation of the spindle, toward and away from the axis of rotation, collapse means carried by and rotatable with, the spindle and movable relative thereto and connected to the carriage for effecting movement of the carriage in one direction upon movement of the collapse means relative to the spindle in one direction during rotation of the spindle, driven taper control means, settable means drivingly interconnecting the taper control means and the collapse means and, by movement relative to at least one of said means, being settable, selectively, in different positions, in each of which positions it connects the taper control means to the collapse means for a normal movement of the collapse means in said one direction by the taper control means, which normal movement is in a predetermined relation to the rate of rotation of the head, the connection of the settable means to the collapse means being such that said settable means, by its said movement from one set position to another, superimposes on said normal movement of the collapse means in said one direction an additional movement in said one direction, and power means for causing said movement of the settable means from one of said set positions to another at a rate which causes said additional movement of the collapse means in said one direction at a rate greater than said normal movement.

2. The structure according to claim 1 wherein the taper control means includes a pair of elements movable endwise of the spindle independently of each other, the settable means connect the elements for movement endwise of the spindle in fixed positions relative to each other in fixed positions of the settable means, and the settable means are operable to move the elements endwise of the spindle relative to each other upon said movement of the settable means for changing the setting.

3. The structure according to claim 2 wherein the settable means is power extensible and contractable endwise of the spindle, and is lockable against extension and contraction, selectively, and is connected to the elements so as to move them endwise relative to each other in one direction upon extension and in the opposite direction upon contraction.

4. The structure according to claim 2 wherein the settable means are piston and cylinder assemblage means drivingly interconnecting the elements endwise of the spindle, conduit means adapted for connecting the assemblage means to a source of pressure fluid, and including valve means for controlling the operation of the assemblage means.

5. The structure according to claim 4 wherein the settable means includes a yoke pivotally connected between its ends to one of the elements for rocking about an axis extending transversely of the spindle, the assemblage means comprises a pair of piston and cylinder assemblages, each including a piston member and a cylinder member, means connecting the assemblies to opposite ends of the yoke, respectively, and to the other element, one member of each assemblage to its associated end of the yoke and the other member to said other element.

6. The structure according to claim 4 wherein each assemblage means includes a piston member and a cylinder member, a stop connected in fixed position relative to one of the members, the stop including an adjustable abutment adjustable endwise of the associated assemblage and aligned with the other member for limiting the maximum extension of the members.

7. The structure according to claim 1 wherein the driven taper control means comprises a sleeve coaxial with the spindle and movable axially thereof relative thereto, a sine bar drivingly connected to the sleeve, the collapse means includes a non-rotative tube coaxial with the sleeve and movable axially in opposite directions relative to the sleeve and to the spindle for effecting said movement of the tool carriage, a yoke pivotally connected between its ends to the tube for rocking about an axis normal to the axis of rotation, said yoke ends being disposed at diametrically opposite sides of said axis, and piston and cylinder assemblages are disposed at diametrically opposite sides of the axis and extend lengthwise thereof, each assemblage is connected at one end to the sleeve and at the other end to the end of the yoke at the same side of the axis as the assemblage.

References Cited in the file of this patent
UNITED STATES PATENTS

| | | |
|---|---|---|
| 2,054,028 | Benninghoff | Sept. 8, 1936 |
| 2,318,177 | Mathias | May 4, 1943 |
| 2,679,057 | Sawdey | May 25, 1954 |
| 2,996,736 | Benninghoff | Aug. 22, 1961 |